United States Patent [19]
Arroyo

[11] Patent Number: 5,410,629
[45] Date of Patent: Apr. 25, 1995

[54] OPTICAL FIBER CABLE WHICH INCLUDES WATERBLOCKING AND FREEZE PREVENTING PROVISIONS

[75] Inventor: Candido J. Arroyo, Lithonia, Ga.

[73] Assignee: AT&T Corp., Murray Hill, N.J.

[21] Appl. No.: 994,569

[22] Filed: Dec. 22, 1992

[51] Int. Cl.$^6$ .............................................. G02B 6/44
[52] U.S. Cl. .................................................... 385/109
[58] Field of Search ............... 385/100, 101, 102, 103, 385/104, 105, 106, 107, 108, 109, 110, 111, 112, 113, 114; 252/70, 73, 75

[56] References Cited

U.S. PATENT DOCUMENTS

| | | | |
|---|---|---|---|
| 3,425,971 | 2/1969 | Gugliemeill et al. | 260/17.4 |
| 4,002,819 | 1/1977 | Woytiuk | 174/23 |
| 4,176,240 | 11/1979 | Sabia | 174/23 |
| 4,802,732 | 2/1989 | Fakuma et al. | 385/114 |
| 4,909,592 | 3/1990 | Arroyo et al. | 385/113 |
| 4,946,237 | 8/1990 | Arroyo et al. | 350/96.23 |
| 5,020,875 | 6/1991 | Arroyo et al. | 350/96.23 |
| 5,138,685 | 8/1992 | Arroyo et al. | 385/113 |
| 5,138,685 | 8/1992 | Arroyo et al. | 385/113 |
| 5,179,611 | 1/1993 | Umeda et al. | 385/112 |

FOREIGN PATENT DOCUMENTS

| | | |
|---|---|---|
| 62-015510 | 1/1987 | Japan . |
| 63-172887 | 7/1988 | Japan . |
| 05140138 | 6/1993 | Japan . |

OTHER PUBLICATIONS

Djock, et al., "Review of Synthetic and Starch-Graft Copolymer Superabsorbents," Absorbents Products Conf., Nov. 16-17, 1983.

*Primary Examiner*—Rodney B. Bovernick
*Assistant Examiner*—John Ngo
*Attorney, Agent, or Firm*—Donald E. Hayes, Jr.

[57] ABSTRACT

The foregoing problems of the prior art have been overcome by cables of this invention. An optical fiber cable includes a core comprising at least one optical fiber transmission medium, a tubular member in which is disposed the core and which is made of a plastic material and a sheath system which is disposed about the tubular member. Additionally, a compositional blend is disposed in the tubular member and capable of performing dual functions by blocking the longitudinal flow of water as well as preventing freezing of water or moisture within the cable. Preferably, the composition includes a superabsorbent constituent blended with an antifreeze constituent, which is then disposed along one longitudinally extending member. In addition to being sprayed onto a tape or other longitudinal member, the compositional blend may also be electronically deposited directly onto the transmission matter, sheath system or core tube.

16 Claims, 3 Drawing Sheets

OPTICAL FIBER CABLE WHICH INCLUDES WATERBLOCKING AND FREEZE PREVENTING PROVISIONS

TECHNICAL FIELD

This invention relates to an optical fiber cable which includes waterblocking and freeze preventing provisions. More particularly, this invention relates to an optical fiber cable which includes a compositional blend positionable within the cable core and capable of blocking water flow longitudinally along the cable and preventing the freezing of water or moisture in the cable.

BACKGROUND OF THE INVENTION

In the cable industry, it is well known that changes in ambient conditions lead to differences in water vapor pressure between the inside and the outside of a plastic cable jacket. This generally operates to diffuse moisture from the outside of the cable to the inside of the cable. Eventually, this will lead to an undesirably high moisture level inside a core of the cable, especially if a plastic jacket is the only barrier to the ingress of the moisture. High levels of condensed moisture inside a cable core may have a detrimental effect on the transmission characteristics of an optical fiber cable and a metallic conductor cable.

Furthermore, water may enter the cable because of damage to the cable which compromises its integrity. For example, lightning and rodent attacks or mechanical impacts may cause openings in the sheath system of the cable to occur, allowing water to enter and, if not controlled, to move longitudinally along the cable into splice closures, for example.

In the prior art, various techniques have been used to prevent the ingress of water through the sheath system of a cable and along the core. For example, a metallic shield which often times is used to protect a metallic conductor cable against lightning and rodent attacks is provided with a sealed longitudinal seam.

Because lightning strikes may cause holes in a metallic shield, it is not uncommon to include additional provisions for preventing the ingress of water into the core. Waterblocking materials have been used to fill cable cores and to coat portions of cable sheath systems to prevent the movement longitudinally thereof of any water which enters the cable. See U.S. Pat. No. 4,176,240 which issued on Nov. 27, 1979, in the name of R. A. Sabia.

However, in addition to creating housekeeping problems, some filling materials have adversely affected the mutual capacitance of the core. This problem has been overcome by a filling material comprising a mixture of a hydrophobic powder in the form of water repellent treated calcium carbonate and a hydrophilic powder in the form of at least one high molecular weight resin rapidly hydratable to form a viscous solution. See U.S. Pat. No. 4,002,819.

Waterblocking provisions inside the core may be other than a filling material. See U.S. Pat. No. 4,946,237 which issued on Aug. 7, 1990 in the names of C. J. Arroyo and P. F. Gagen. A longitudinally extending waterblocking member inside a core tube may take several forms. For example, it may comprise a laminate comprising a powder captured between two tapes. Or, it may comprise a substrate tape which is impregnated with a material. When exposed to water, the impregnating material reacts, swells, and causes the tape to prevent the passage of water through the sheath system toward the core and its migration in a direction longitudinally along the cable. In one embodiment, the impregnating material comprises a film of a water swelling or so-called superabsorbent material. In another embodiment, a tape may be treated with a coating comprising a superabsorbent material. Further, the waterblocking provisions within the core may comprise one or more yarns which have been impregnated with a superabsorbent material or which comprise superabsorbent fibers. Also, the waterblocking provisions in the core may comprise a waterblocking tape, which may engage an inner surface of the core tube, and a waterblocking yarn or yarns.

Lately, optical fiber cables have made great inroads into the communications cable market. Although for slightly different reasons, undesired moisture may also detrimentally affect the operation of an optical fiber cable as well. For example, the formation of and retention of ice around the optical fibers provide a microbending crushing effect which is known to increase undesirably the attenuation. However, even when efforts are made to prevent water ingress, sheath damage may provide pathways for water into cable and upon freezing, attenuation problems will still result. Additionally, it has been found that the use of a superabsorbent tape in an optical fiber cable core may result in an increased microbending loss in the fibers because of freezing of the activated superabsorbent gel.

Another problem relates to the use of riser cables which connect interoffice and intercity trunks. Typically, indoor optical fiber cables are all air core while outdoor cables include filling materials in the core to provide resistance to water penetration. Desirably, the use of one cable to extend from an outside manhole and on into a building would result in substantial cost savings because of the elimination of the need for additional splice locations. In order to use one length of cable to extend from a splice location in a manhole outside a building into the building and then to distribution points, the cable must include suitable waterblocking and freeze prevention provisions to satisfy outside requirements which do not compromise the fire retardance properties of the cable needed for internal building use.

In commonly-assigned, copending application Ser. No. 07/906157, filed Jun. 29, 1992 (now U.S. Pat. No. 5,321,788) in the name of C. J. Arroyo, J. R. Petisce, and J. J. Sheu, it is disclosed, how as distinct components, an antifreeze material and a superabsorbent material may be individually applied to two separate substrate tapes. According to this prior art teaching, the two tapes, each having been separately treated with both the antifreeze and the superabsorbent material, may then be placed longitudinally adjacent to one another such that the individual layers of antifreeze and superabsorbent materials are between the tapes.

What is needed and seemingly what is not available is an optical fiber cable which includes a single compositional powder blend capable of providing dual functions by protecting against the flow of water along the cable as well as protecting the optical fibers against a freezing environment. Also desirable is a cable which has sufficient flame retardance so that the cable may be used inside buildings such as in risers, for example.

SUMMARY OF THE INVENTION

The foregoing problems of the prior art have been overcome by cables of this invention. An optical fiber cable includes a core comprising at least one optical fiber transmission medium, a tubular member in which is disposed the core and which is made of a plastic material and a sheath system which is disposed about the tubular member. Additionally, a compositional blend is disposed in the tubular member and capable of performing dual functions by blocking the longitudinal flow of water as well as preventing freezing of water or moisture within the cable. Preferably, the composition includes a superabsorbent constituent blended with antifreeze constituent, which is then disposed along one longitudinally extending member. In addition to being sprayed onto a tape or other longitudinal member, the compositional blend may also be electronically deposited directly onto the transmission matter, sheath system or core tube.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
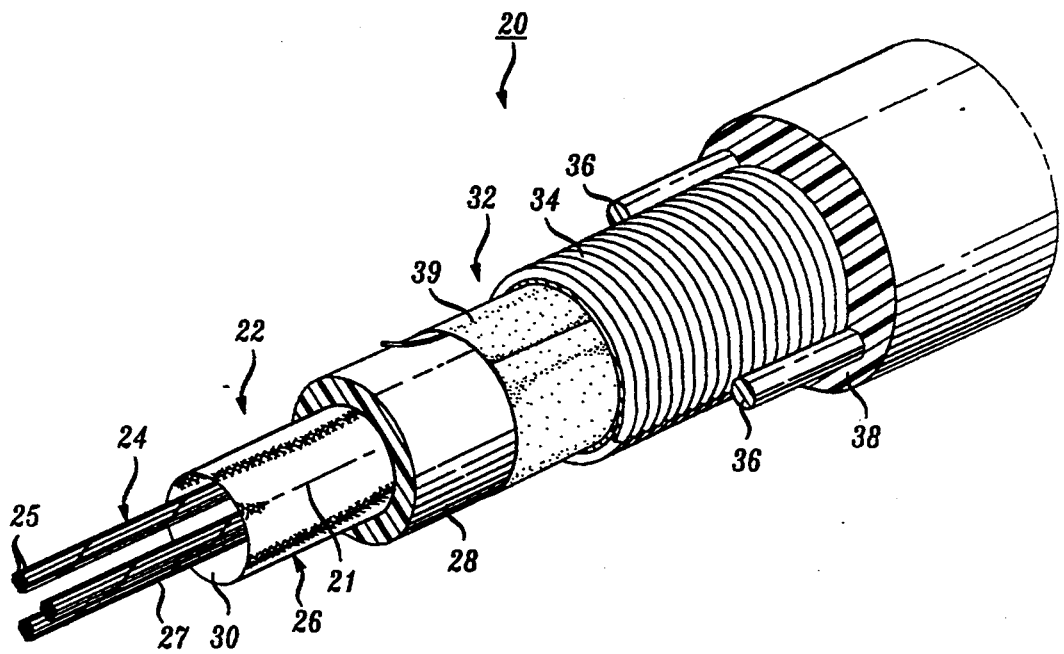
FIG. 1 is a perspective view of a cable having a core which includes provisions for blocking the flow and preventing the freezing of water.
Figure 2:
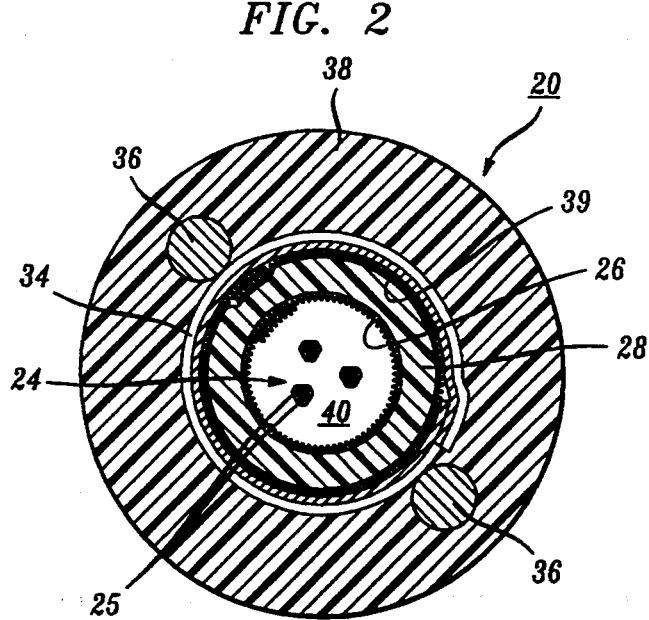
FIG. 2 is an end sectional view of the cable of FIG. 1.

Referring now to FIGS. 1 and 2, there is shown a communications cable which may incorporate the features of the present invention and is designated generally with the numeral 20 and which has a longitudinal axis 21. It includes a core 22 comprising one or more units 24—24 of optical fibers 25—25 which may be buffered with an outer layer of polyvinyl chloride (PVC), for example. Each of the units 24—24 is wrapped with a binder ribbon 27. The core 22 includes a carrier member 26 which is disposed within a tubular member 28 referred to as a core tube of a sheath system 32. Preferably, the core tube 28 is enclosed by a metallic shield 34 and an outer plastic jacket 38. The sheath system 32 also includes two diametrically opposed strength members 36—36.

In one cable construction, the carrier matter 26 is a spunbonded non-woven polyester tape material and includes a web structure comprised of randomly-arranged fibers which are bonded primarily at the filament crossovers. Continuity of the fibers of the web, while not necessary to the invention, will provide the web with an increased tensile strength. The fibers may be formed of any plastic resin, or other appropriate material which has the capability of maintaining its shape in the presence of the temperatures encountered during the extrusion of the core tube 28. The fibers of the web structure are arranged so that air cells or pockets are formed.

A polyethylene terephthalate fiber product, formed into a web structure as described above has been identified under the registered. trademark "Reemay" by the E. I. du Pont de Nemours and Company, Incorporated of Wilmington, Del. Presently, the Reemay® web structure is available in various thicknesses and densities from Reemay, Inc. of Old Hickory, Tenn. The properties of Reemay tapes are further defined and described in Bulletin R-1, dated March, 1986, entitled "Properties and Processing of Reemay Spunbonded Polyester" from E. I. du Pont de Nemours and Company, Incorporated, Wilmington, Del.

Although in a preferred cable construction, a spunbonded polyester tape is used, others also are acceptable. For example, the tape which is to be impregnated may be a nylon spunbonded fabric, non-woven glass, polypropylene melt blown non-woven fabric, polyurethane spunbonded fabric or TCF cellulose fabric, for example.

Advantageously, the carrier tape 26 of this invention also acts as a thermal barrier not only during the extrusion of the core tube 28 but also during the extrusion of the jacket 38. As the jacket 38 is extruded-over the shield 34, heat is available for transfer into the optical fiber core. The carrier tape 26 of the cable 20 has the ability to insulate against the heat caused by the extrusion of the core tube and the jacket.

Another important characteristic of the substrate tape is the stiffness of the body of the material which comprises the tape. Within limits, as the material of the substrate tape is made increasingly stiffer, it is still relatively easy to form the tape longitudinally about the units 24—24, without wrinkling. However, it is important that the material have sufficient memory so that it tends to spring outwardly into engagement with the inner surface of the core tube 28. As a desirable consequence, a minimum overall diameter is achieved for the cable which will meet all the necessary requirements. Stiffness of the material for the substrate tape is controlled by a combination of factors such as the number of fibers per unit volume, thickness of the material, size of the fibers and the amount and type of binder used in the material. Increasing the thickness of the material obviously increases the cost of the material per unit of surface area of cable covered. Increasing the number of the fibers per unit volume or increasing the amount of binder tends to increase the ability of the material to delay heat transfer. At least three factors, 1) formability of the carrier tape 26, 2) cost of the tape, and 3) insulative capability of the tape should be considered and balanced in providing the proper material for use in a particular cable.

The spunbonded polyester tape may combine the thermal, chemical and mechanical properties of polyester fibers with a spunbonded structure to provide a tape which is suitable for use in a communications cable. These properties include a relatively high tensile strength and elongation, excellent tear strength, and resistance to temperatures which might be expected in a burning building and which may reach values as high as about 2000° F. Desirably, the cables of this invention include waterblocking and antifreeze materials, insulation and jacketing materials, such as polyvinyl chloride, for example, which result in passage of Underwriters Laboratories test UL 1666 for riser cable. In each sample tested, the flame height was substantially less than the allowable 336 cm over a one minute time duration.

As stated in the Background of the Invention herein, commonly-assigned, copending application Ser. No. 07/906,157 (now U.S. Pat. No. 5,321,788) discloses a construction method wherein each of the earlier tapes is coated with a liquid antifreeze and then a superabsorbent powder is laminated between these two tapes. As an alternative, and more efficient construction method, the present invention provides a compositional blend compounded prior to application to the tape contributes both antifreeze and waterabsorbing properties to the cable.

More specifically, in accordance with the present invention, a single compositional blend is developed as a mixture of an antifreeze material with a superabsorbent powder. The blend of the present invention may then be applied to a tape substrate by spraying or any other well-known application method. In addition, it should be noted that the composition of blend may also be applied via electronic deposition directly onto the transmission medium, the sheath system or the core tube.

Such compositional blends of this application provide a single substance capable of both blocking the flow of water/moisture within a cable, as well as preventing freezing of various constituents which may be located within the cable. Since one material achieves both of the desired functions, the processing time is substantially shortened by the elimination of having to separately treat each tape with both an antifreeze material and then later separately treat the tape with a superabsorbent material.

In the preferred embodiment, the water soluble material, or mixture of water soluble materials, which prevents the freezing of water or moisture within the cable includes polyethylene glycol. However, other materials which are suitable as an antifreeze constituent include polypropylene glycol, dimethyl sulfoxide and sodium or potassium chloride. The latter material is used presently in powder form as a de-icer on roads.

Superabsorbents are hydrophilic materials which can absorb and retain water without dissolution in the fluid being absorbed. See J. C. Djock and R. E. Klern "Review of Synthetic and Starch-Graft Copolymer Superabsorbents" prepared for the Absorbent Products Conference held Nov. 16–17, 1983 in San Antonio, Tex. and incorporated by reference hereinto. Properties such as enzyme stability, biodegradability, absorbent capacity and rate of uptake are used to characterize a superabsorbent material. One of the early superabsorbents was a saponified starch graft polyacrylonitrile copolymer. See U.S. Pat. No. 3,425,971. The above-identified patent discloses saponifying starch-graft polyacrylonitrile copolymers with aqueous bases.

The two major superabsorbents which are available today are cellulosic or starch-graft copolymers and synthetic superabsorbents. There are two major broad classes of synthetic superabsorbents. These are the polyelectrolytes and the non-electrolytes. The polyelectrolytes are the most important and fall into several classes. Of these, the polyacrylic acid-based superabsorbents are most common. As with cellulosic-graft copolymer superabsorbents, the capacity of synthetic superabsorbents decreases with increasing salinity.

The polyacrylic acid class of superabsorbents includes both homopolymers and copolymers of acrylic acids and acrylate salts. The monomer units usually are polymerized to produce a water-soluble polymer which is then rendered insoluble by ionic and/or covalent cross-linking. Cross-linking of the polymer may be accomplished with a multivalent Cross-linking of the polymer may be accomplished with a multivalent cation, radiation, or with a cross-linking agent. The absorbency of the product is determined by the number of ionizable groups, usually carboxylates, and the cross-linking density.

Figure 3:
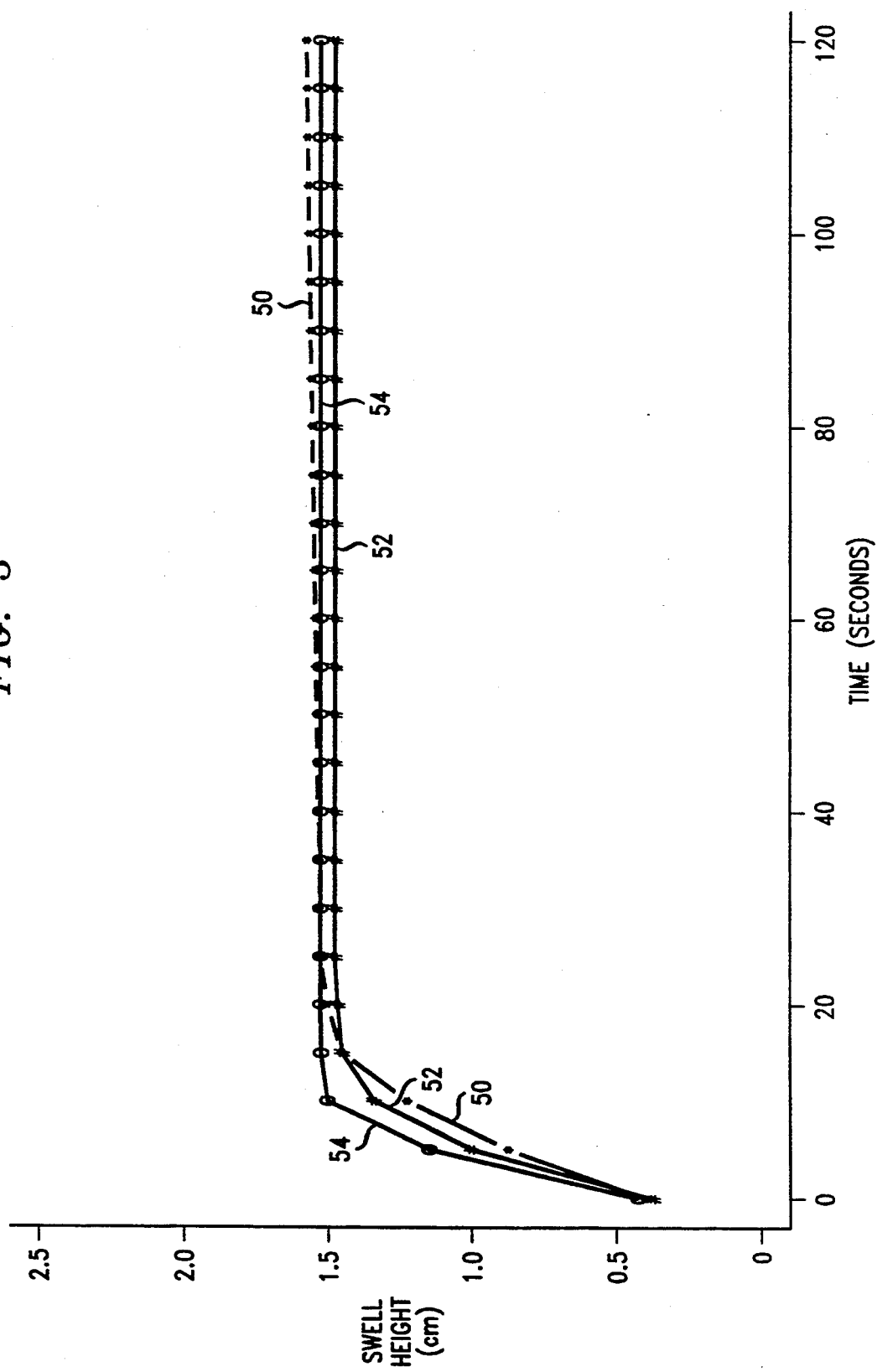
FIG. 3 is a graph which depicts swellability test results for various compositional blends in accordance with the present invention.

Tests were conducted to determine if tapes which included antifreeze constituents as well as superabsorbent material met minimum swell height requirements of 0.5 cm in 60 seconds. In FIG. 3, are shown swellability test results for a plurality of compositional blends, each comprising both superabsorbent and antifreeze constituents. Specifically, FIG. 3, depicts the swellability results of a compositional blend which includes one particular superabsorbent material, namely polysodium acrylate, as effected by varying amounts of an antifreeze material, namely polyethylene glycol. As can be seen in FIG. 3, maximum swell height was achieved with a carrier tape having only superabsorbent powder, with no antifreeze material, positioned between two substrate tapes. The curve identified as element 50 on FIG. 3 tracks results for this example where polysodium acrylate superabsorbent is in distilled water. Curve 52 present results of a compositional blend which includes polysodium acrylate with 5% polyethylene glycol. Similarly, curve 54 presents results of a blend which combine polysodium acrylate with 80% polyethylene glycol.

Although each of tapes which included superabsorbent and antifreeze materials achieved less total swell height than that of the tape which included superabsorbent only, they result in a faster rate-of-rise, while meeting the minimum swell height requirements of 0.5 cm in 60 seconds. It should be noted and appreciated that given the expected environment in which the cable of the present invention will be used, the rate-of-rise characteristic of a given blend is a more critical parameter in gauging the actual effectiveness of preventing the ingress of water within the cable core than is the ultimate total swell height achieved. Other tests may be run including combining slightly different superabsorbent or antifreeze constituents. However, due to wide range in the ratios of constituents used in the results set forth herein, it is believed that similar advantageous results may be predictably obtained without departing from the scope of the present invention.

It also becomes important that the introduction of the antifreeze provisions presents no added loss into the cable beyond acceptable limits. It has been shown that for tapes treated with ethylene glycol or propylene glycol with a superabsorbent polymer therebetween, the added losses are within acceptable limits.

Each of the tapes also may be provided with resistance to microbial growth. Non-cellulosic tapes are used and the superabsorbent materials are microbial resistant. See U.S. Pat. No. 5,020,875 which is incorporated by reference hereinto.

Although the tapes thus far have been polyester nonwoven tapes, it also is possible to utilize between two tapes which are wood pulp derivatives. These perform equally as well as the others described except that fungus growth is experienced. In order to deal with the fungus growth, such cellulosic tapes are treated with antimicrobial resistant material such as Intersept antimicrobial resistant material as marketed by Interface Research Corporation or TK100 material which is marketed by Calgon Corporation.

As mentioned in the Background of the Invention, it becomes desirable to be able to extend a cable from a manhole into a building and up a riser shaft. Such a cable not only must include waterblocking and antifreeze provisions for the outside portion of the use but also must have sufficiently low flame retardance and smoke generation properties.

Figure 4:
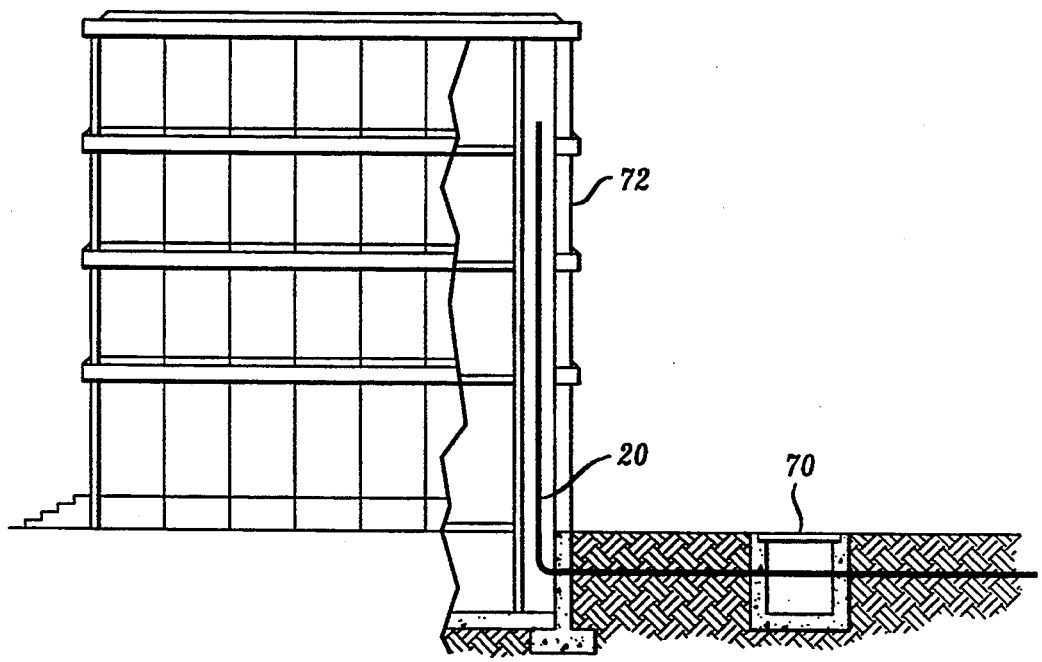
FIG. 4 is a schematic view of a cable extending from a manhole into a building.

As a result of the cable 20 having antifreeze and waterblocking capabilities, the spectrum of use of the cable has been widened. As can be seen in FIG. 4, the cable 20 may extend from an outside manhole 70 into a building 72 and up a riser shaft.

Figure 5:
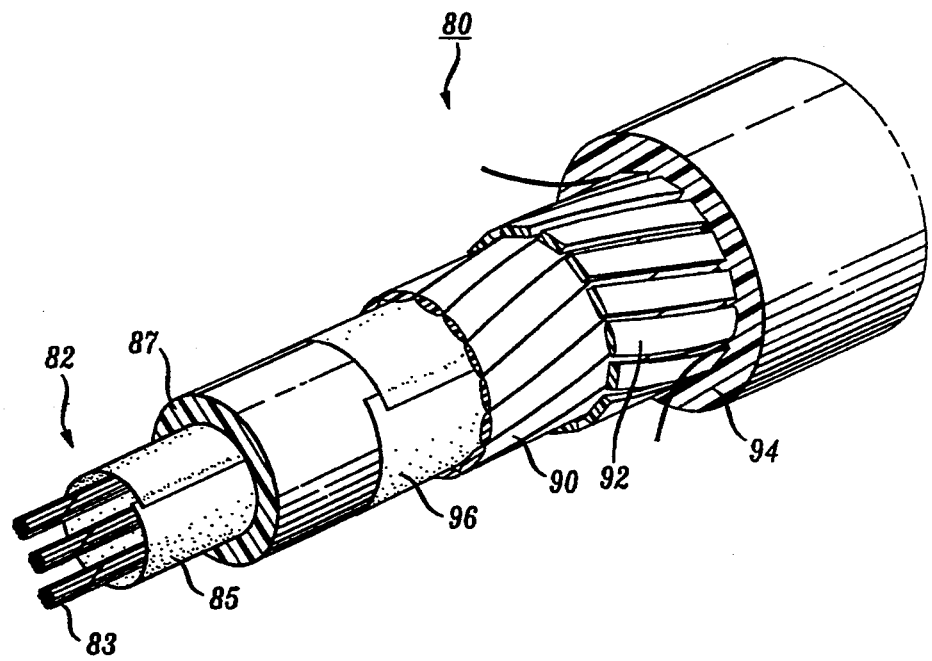
FIG. 5 is a perspective view of another cable of this invention.

In another embodiment shown in FIG. 5, a cable 80 which is suitable for installation between a manhole and a distribution point within a building includes a core 82 comprising a plurality of optical fibers 83—83 which may be in ribbon form (not shown) and a laminate 85. The laminate 85 comprises two tapes treated with the compositional blend of the present invention. Enclosing the foregoing is a tubular member 87. About the tubular member 87 is disposed a strength member system which includes an inner layer 90 comprising relatively flexible rovings and an outer layer 92 comprising at least some rod-like strength members. A jacket 94 made of a plastic material which is flame retardant is disposed about the strength member system. A tape 96 which has been treated or laminated to include only a waterblocking function may be interposed between the tubular member 87 and the strength member system.

It is to be understood that the above-described arrangements are simply illustrative of the invention. Other arrangements may be devised by those skilled in the art which will embody the principles of the invention and fall within the spirit and scope thereof.

I claim:

1. An optical fiber cable, which includes:
   a core comprising at least one optical fiber transmission medium;
   a tubular member in which is disposed said core;
   a sheath system which is disposed about said tubular member; and
   means disposed within said cable for blocking the longitudinal flow of water and for preventing freezing of water within said cable, said means including a compositional blend of a superabsorbent constituent and an antifreeze constituent, wherein said antifreeze constituent is selected from the group consisting of polypropylene glycol and polyethylene glycol.

2. The cable of claim 1, wherein said means includes a longitudinally extending laminate comprising two substrate tapes having the compositional blend therebetween.

3. The cable of claim 1, wherein said means includes a longitudinal extending tape which has been impregnated with a mixture of an antifreeze constituent and a superabsorbent constituent.

4. The cable of claim 1, wherein said antifreeze constituent is selected from the group consisting of a water soluble material and a mixture of water soluble materials.

5. The cable of claim 1, wherein said antifreeze constituent comprises polypropylene glycol.

6. The cable of claim 1, wherein said antifreeze constituent comprises polyethylene glycol.

7. The cable of claim 1, wherein materials of said cable cause said cable to have suitable resistance to flame and smoke spread.

8. The cable of claim 1, wherein said means is positioned within said tubular member.

9. The cable of claim 1, wherein said means is electrostatically deposited onto the optical fiber transmission medium.

10. The cable of claim 1, wherein said means is electrostatically deposited onto the tubular member.

11. The cable of claim 1, wherein said means is electrostatically deposited onto the sheath system.

12. The cable of claim 1, wherein said superabsorbent constituent is microbial resistant.

13. The cable of claim 1, wherein said means comprises two longitudinally extending tapes, each comprising a non-cellulosic material.

14. The cable of claim 1, wherein said means comprises two longitudinally extending cellulosic based tapes, each having been treated with a microbial resistant material.

15. An optical fiber cable, which includes:
   a core comprising at least one optical fiber transmission medium;
   a tubular member in which is disposed said core;
   a sheath system which is disposed about said tubular member; and
   means disposed within said cable for blocking the longitudinal flow of water and for preventing freezing of water within said cable, said means including a compositional blend of a superabsorbent constituent and an antifreeze constituent, wherein said antifreeze constituent comprises dimethyl sulfoxide.

16. An optical fiber cable which includes:
   a core comprising at least one optical fiber transmission medium;
   a tubular member in which is disposed about said core;
   a sheath system which is disposed about said tubular member; and
   means disposed within said cable for blocking the longitudinal flow of water and for preventing freezing of water within said cable, said means including a compositional blend of superabsorbent constituent and an antifreeze constituent, wherein said antifreeze constituent comprises potassium salts.

* * * * *